United States Patent [19]
Honami et al.

[11] 3,955,266
[45] May 11, 1976

[54] VACUUM SEALED MOLDING PROCESS FOR PRODUCING MOLDS HAVING A DEEP CONCAVE PORTION OR A CONVEX PORTION

[75] Inventors: Norimitsu Honami; Yasuhiro Uno, both of Toyokawa; Tamotsu Ito, Toyohashi; Mitsuhide Ogura, Toyokawa, all of Japan

[73] Assignee: Sintokogio, Ltd., Nagoya, Japan

[22] Filed: Apr. 26, 1974

[21] Appl. No.: 464,683

[30] Foreign Application Priority Data
May 2, 1973 Japan.............................. 48-49375
Sept. 25, 1973 Japan.............................. 112044[U]

[52] U.S. Cl................................ 29/421 R; 29/428; 164/7; 164/160; 264/89; 264/92; 264/219; 264/DIG. 78; 425/388
[51] Int. Cl.²...................... B22C 9/00; B29C 1/02; B29C 17/04
[58] Field of Search................ 264/89, 90, 92, 101, 264/102, 219–221, 275, 333, 255, DIG. 78, 93, 94; 425/388, DIG. 125, 126; 164/7, 160; 29/421, 469, 428

[56] References Cited
UNITED STATES PATENTS

| | | | |
|---|---|---|---|
| 2,990,581 | 7/1961 | Rowe, Jr........................... | 264/92 X |
| 3,088,174 | 5/1963 | Kolt................................ | 264/275 X |
| 3,235,639 | 2/1966 | Knowles........................... | 264/92 |
| 3,342,914 | 9/1967 | Edwards.......................... | 264/92 X |
| 3,400,111 | 9/1968 | Schwartz......................... | 264/92 X |
| 3,405,026 | 10/1968 | Roberts........................... | 264/255 X |
| 3,419,455 | 12/1968 | Roberts........................... | 264/255 X |
| 3,789,907 | 2/1974 | Nakata et al..................... | 164/7 |
| 3,843,301 | 10/1974 | Hijikata et al.................... | 425/388 |

OTHER PUBLICATIONS

Philip F. Charles, Plastics World, "Engineer's Report – Vacuum Systems for Thermoforming," 4–1963, Vol. 21, No. 4 p. 34.

*Primary Examiner*—Jan H. Silbaugh
*Attorney, Agent, or Firm*—Armstrong, Nikaido & Wegner

[57] ABSTRACT

A molding process for casting operations in which castings having a deep concave portion or a high convex portion such as pots and bathtubs are cast using vacuum sealed molds on which films are applied to be in tight contact with them, and a film forming auxiliary device for use in molding such vacuum sealed molds.

1 Claim, 16 Drawing Figures

VACUUM SEALED MOLDING PROCESS FOR PRODUCING MOLDS HAVING A DEEP CONCAVE PORTION OR A CONVEX PORTION

BACKGROUND OF THE INVENTION

The present invention belongs to the field of molding processes for producing vacuum sealed molds, and in particular, the present invention makes it possible to form the molds which are difficult to mold.

Vacuum sealed molding processes, which have been developed recently as a useful method for making molds, include a step to place a synthetic resin film in tight contact with the surface of the pattern. However, in accordance with the prior art, when the pattern has a deep concave portion or a high convex portion, it is very difficult to stretch the synthetic resin film uniformly over the pattern surface, and therefore the film cannot be applied properly on the bottom or the top surface of the pattern, so that the molds cannot have correct shapes. This presents a great disadvantage.

When performing casting operations using molds by a vacuum sealed molding process, it frequently occurs that the films forming a mold cavity are subjected to the radiation heat of molten metal, and even the film portions not in contact with the molten metal are melted and disappear. If the films are melted in this manner, the charged material loses its original state, which naturally leads to a collapse of the mold. Thus, it is desirable to use a coating material having some shielding effect after the film has melted and disappeared.

SUMMARY OF THE INVENTION

The present invention relates to a molding process in which a heated film is brought into an external pattern while being stretched by an auxiliary pattern and the film is placed in tight contact with the surface of the external pattern using a sucking action, and subsequently a molding flask is assembled to the external pattern to be filled with a charging material so that an internal mold is formed, and on the other hand, a heated film is put on an internal pattern while being stretched by a frame having an annular portion and the film is placed in tight contact with the surface of the internal pattern using a sucking action, and subsequently a molding flask is assembled to the internal pattern to be filled with the charging material so that an external mold is formed, and then said internal and external molds are assembled together so that a complete mold having a deep concave portion or a high convex portion is produced with the use of a vacuum sealed molding process; and the present invention further relates to a film forming auxiliary device in which a coating operation can be performed simultaneously with the forming operation of the film to eliminate a possibility that, when pouring a molten metal into the mold completed as described above and having the films in tight contact therewith, the film portions not in contact with the molten metal are melted by the radiation heat of the molten metal.

An object of the present invention is to provide a molding process for producing vacuum sealed molds having a deep concave portion or a high convex portion such as pots and bathtubs.

Another object of the present invention is to provide a process for placing a film in tight contact with a mold when said vacuum sealed molds are formed.

A further object of the present invention is to provide a film forming auxiliary device for use in vacuum sealed molding processes, which is adapted to perform a coating operation on vacuum sealed molds having a deep concave portion or a high convex portion by the use of the vacuum sealed molds.

These objects and features of the present invention will become more clear by the following description of preferred embodiments taking reference with the attached drawings, in which:

FIG. 1 is a sectional view illustrating a step for heating a film to be placed in tight contact with an external pattern;

FIG. 2 is a sectional view showing a step in which the film is placed substantially along the surface of the external pattern;

FIG. 3 is a sectional view illustrating a state in which the film is completely in tight contact with the external pattern;

FIG. 4 is a sectional view showing a step for molding an internal mold;

FIG. 5 is a sectional view illustrating the internal mold in a completed state;

FIG. 6 is a sectional view showing a step for heating a film to be placed in tight contact with an internal pattern;

FIG. 7 is a sectional view illustrating a step in which the film is placed substantially along the surface of the internal pattern;

FIG. 8 is a sectional view showing a step for molding an external mold;

FIG. 9 is a sectional view illustrating the external mold in a completed state;

FIG. 10 is a sectional view showing a completed mold which can be poured in this state;

FIG. 11 is a partly broken away front view showing an auxiliary pattern device;

FIG. 12 is a partly broken away front view illustrating another embodiment of the auxiliary pattern device;

FIGS. 13 and 14 are sectional views showing steps for forming a film on a pattern having a concave portion; and FIGS. 15 and 16 are sectional views illustrating steps for forming a film on a pattern having a convex portion.

The present invention will be explained hereunder with reference to an embodiment thereof in which a mold for casting a bathtub is formed.

DETAILED DESCRIPTION OF THE INVENTION

Figure 1:
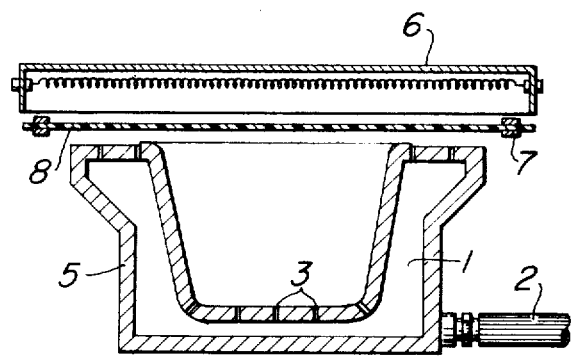
FIGS. 1 through 10 are views showing embodiments of the mold forming steps in accordance with the present invention.

Molding of an internal mold A:

Referring to FIG. 1, a heating means 6 having a heat source such as an electric heater is placed above an external pattern 5 provided therein with a reduced pressure chamber 1 communicating with a vacuum pump (not shown) through a rubber hose 2, the external pattern 5 including a multiplicity of small holes 3 in communication with the reduced pressure chamber 1. A film 8 made of a plastic (such as polyethylene-vinyl-acetate, polystyrene, polyethylene, and the like) and having a thickness of 0.075 – 0.15 mm. is supported at the edges thereof by supports 7 and placed between the heating means 6 and the external pattern 5.

Figure 2:
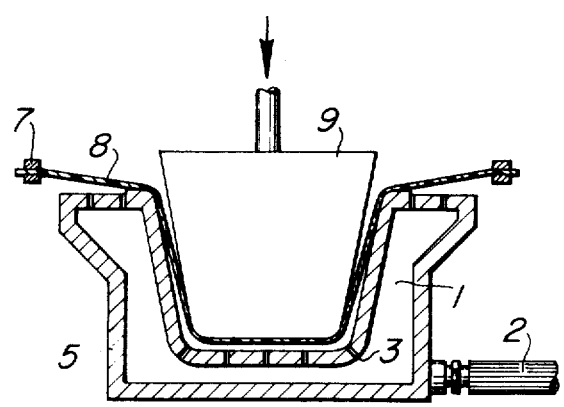

The film 8 is heated by the heating means 6 to a temperature of 80°C – 120°C at which the film 8 shows the best extensibility, followed by the removal of the heating means 6. Then, as shown in FIG. 2, above the film 8 is placed an auxiliary convex member means 9 which has a shape similar to that of an internal mold and to snugly fit into the concave portion of the external pattern 5, and is slightly smaller in volume than said concave portion. The convex member means 9 is inserted into the external pattern 5 with the film 8 being stretched. The supports 7 are lowered so that the surface of the external pattern 5 is covered by the film 8. Subsequently, a communication is established between the reduced pressure chamber 1 in the external pattern 5 and the vacuum pump (not shown) with the result that the film 8 is subjected to the sucking action through the small holes 3 and stretches further to come properly in tight contact with the surface of the external pattern 5.

Figure 3:
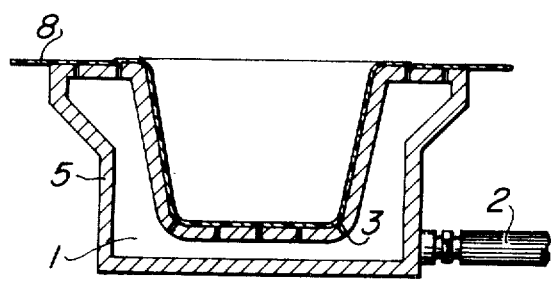

Then, the supports 7 are removed from the film 8, and the convex member means 9 is taken out from the concave portion of the external pattern 5 (FIG. 3). Subsequently, if necessary, a coating operation is performed on the surface of the film 8 as will be described hereinafter.

Figure 4:
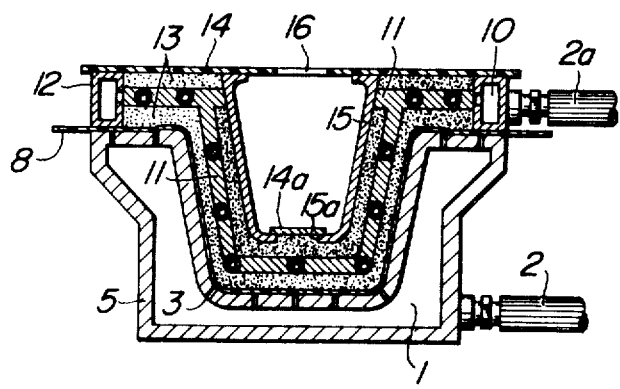
Figure 5:
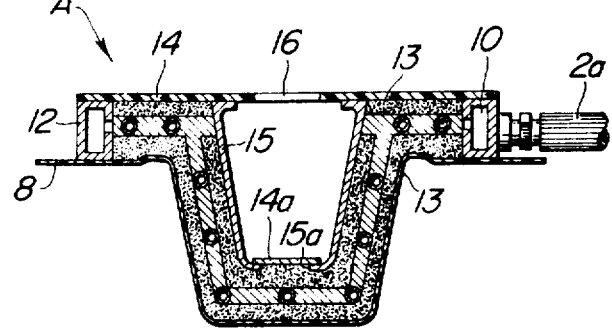

FIG. 4 shows a lower molding flask 12 the wall of which has therein a hollow chamber 10 communicating with a vacuum pump through a rubber hose 2a. A suction pipe 11 in communication with the hollow chamber 10 is provided in the lower molding flask 12, a sucking action being performed by the peripheral surface of the suction pipe 11. The lower molding flask 12 is placed on the external pattern 5, and a charging material 13 such as dry sand and the like is supplied into the lower molding flask 12 from above, with a vibration being applied to the lower molding flask 12 and the external pattern 5 by means of a vibrator and the like. Then, the upper surface of the lower molding flask 12 is covered by an impervious film 14. In this embodiment, a space is formed in the central part of the lower molding flask 12 by an auxiliary frame 15, so that the amount of the charging material 13 is saved. The part of the film 14 covering the auxiliary frame 15 is opened as shown at 16 in the figure, and an opening 15a arranged at the bottom of the auxiliary frame 15 is covered by an impervious film 14a. In the construction having the auxiliary frame 15, when supplying sand into the lower molding flask 12, the part beneath the bottom of the auxiliary frame 15 cannot be filled with the sand satisfactorily. To solve this problem, an opening 15 a is provided in the bottom of the frame 15 so that the sand can be supplied through the openings 16 and 15a. Then, the hollow chamber 10 in the lower molding flask 12 is brought into communication with the vacuum pump (not shown) to start the sucking action of the suction pipe 11, as shown in FIG. 5. And the sucking action of the external pattern 5 is terminated to separate the external pattern 5 from the lower molding flask 12. Thus, the molding of the internal mold A is completed.

Figure 6:
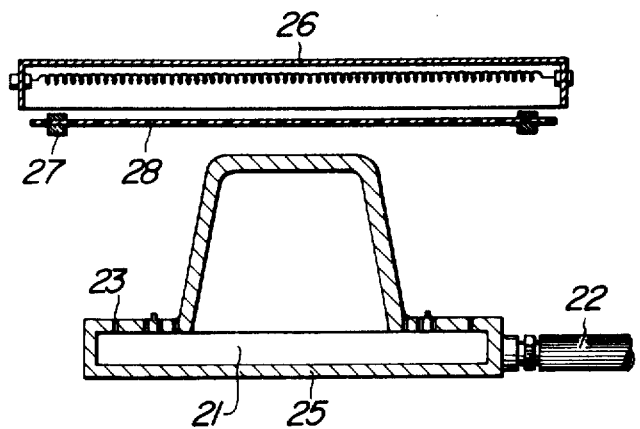
Figure 7:
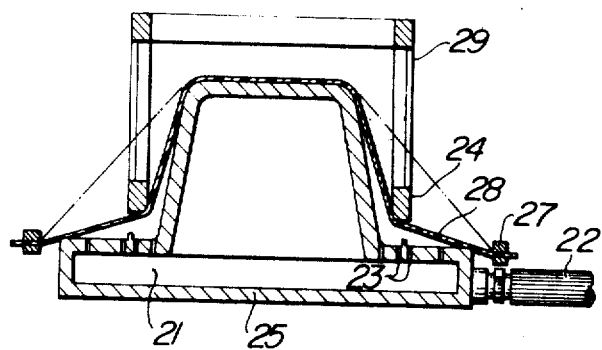

Molding of an external mold B:

As shown in FIG. 6, a heating means 26 is placed above an internal pattern 25 which is provided with a reduced pressure chamber 21, a rubber hose 22, and small holes 23 in the same manner as the external pattern 5 described previously. A film 28 supported at the edges thereof by supports 27 is placed between the heating means 26 and the internal pattern 25. The film 28 is heated by the heating means 26 to a temperature at which the film shows the best extensibility. Then, the heating means 26 is removed, and the supports 27 are lowered to a plane including the surface of the base of the internal pattern 25 (see FIG. 7). With this operation, the central part of the film 28 comes in contact with the top of the internal pattern 25, and the film 28 is stretched by the downward movement of the supports 27 as shown an imaginary line in FIG. 7. Subsequently, as shown in FIG. 7, an auxiliary member 24 is lowered on the internal pattern 25 by means of a suitable lifting gear and the like, with an auxiliary frame 29 at the lower end of the auxiliary member 24 being placed at the base of the internal pattern 25. At this point, the film 28, which has been stretched between the upper end of the internal pattern 25 and the supports 27 as indicated by the imaginary line in the figure, is further stretched to substantially conform with the shape of the internal pattern 25. Then, the reduced pressure chamber 21 in the internal pattern 25 is brought into communication with a vacuum pump, so that the film 28 comes in tight contact with the internal pattern 25 in the same manner as described previously. Subsequently, the supports 27 are removed from the film 28, and the frame 29 is taken out of the convex portion of the internal pattern 25. If necessary, the surface of the film 28 is coated as will be described hereinafter.

Figure 8:
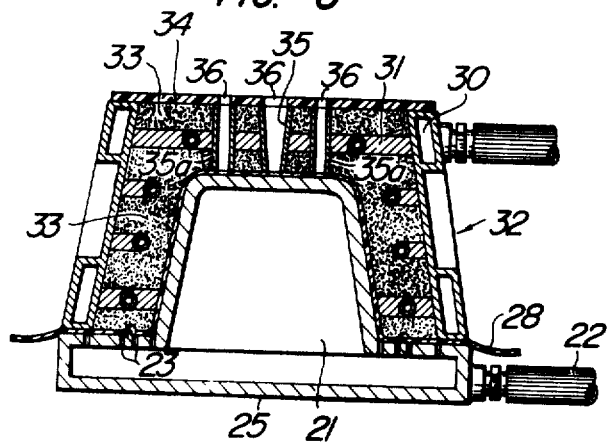

As shown in FIG. 8, an upper molding flask 32 having a hollow chamber 30 and a suction pipe 31 is placed on the internal pattern 25 in the same manner as the molding flask 12 described previously. A charging material 33 such as dry sand and the like is supplied into the upper molding flask 32 from above, with a vibration being applied to the upper molding flask 32 and the internal pattern 25 by means of a vibrator and the like. After this operation, the upper surface of the upper molding flask 32 is covered by an inpervious film 34. In this embodiment, communicating pipes 35a for forming through holes are placed vertically in the upper molding flask 32 before the upper molding flask 32 is filled with the charging material 33, to prevent the destruction of the collapse of the mold cavity during pouring. The film 34 is opened at the parts thereof covering the sprue 35 and the through holes 35a as indicated in the figure by the numerals 36.

Figure 9:
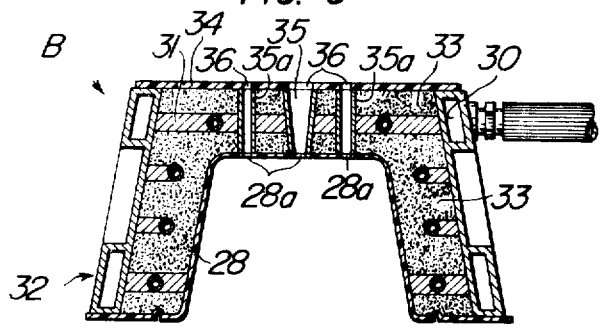
Figure 10:
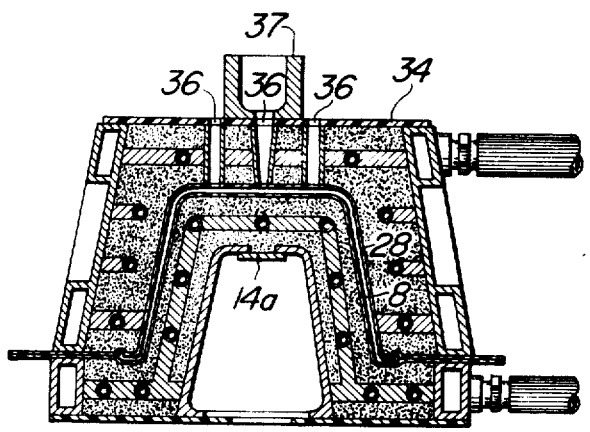

Subsequently, the hollow chamber 30 in the upper molding flask 32 is brought into communication with the vacuum pump (not shown), so that a sucking action is applied to the charging material 33 by the suction pipe 31. At the same time, the sucking action of the internal pattern 25 is terminated to separate the internal pattern 25 from the upper molding flask 32. After this operation, the parts of the film 28 covering the sprue 35 and the through holes 35a are opened as indicated by the numerals 28a in FIG. 9. Thus, the molding of the external mold B is concluded. Completion of a mold:

The internal mold A molded in the manner as described above is turned 180°, and the external mold B is placed on the internal mold A. Then, a pouring basin 37 is placed on the pouring basin 35 of the external mold B to complete a mold. (FIG. 10)

With reference to FIGS. 11 through 16, an explanation will be given hereunder on a film forming auxiliary device in which a coating operation can be performed simultaneously with a film forming operation when producing the mold described above by the use of a vacuum sealed molding process.

Figure 11:
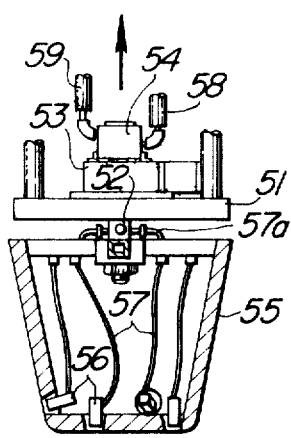
FIGS. 11 through 16 are views illustrating a film forming auxiliary device.
Figure 12:
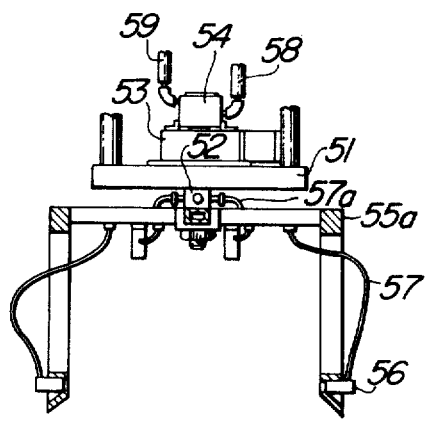

On a vertically movable fitting plate 51 is mounted a reduced speed motor 53 having a hollow rotating shaft 52 extending vertically through the fitting plate 51. A rotary coupling 54 is connected to the upper end of the rotating shaft 52. The lower portion of the rotating shaft 52 extends rotatably through the fitting plate 51 and has securely fixed to the end thereof an auxiliary convex member 55 (FIG. 11) or an auxiliary concave member 55a (FIG. 12). A suitable number of injection nozzles 56 for coating are provided at desired positions on the auxiliary concave member 55a or the auxiliary convex member 55.

To the nozzles 56 are connected hoses 57 each comprising a set of a rubber hose for supplying a coating material and a rubber hose for supplying compressed air. The hoses 57 are introduced into the hollow rotating shaft 52 through pipes 57a branching off from the lower portion of the hollow rotating shaft 52, and are connected to a communicating port (not shown) in the rotary coupling 54. In the figures, the numerals 58 and 59 indicate respectively a pipe for supplying a coating material and a pipe for supplying compressed air which are in communication with the rotary coupling 54.

Figure 13:
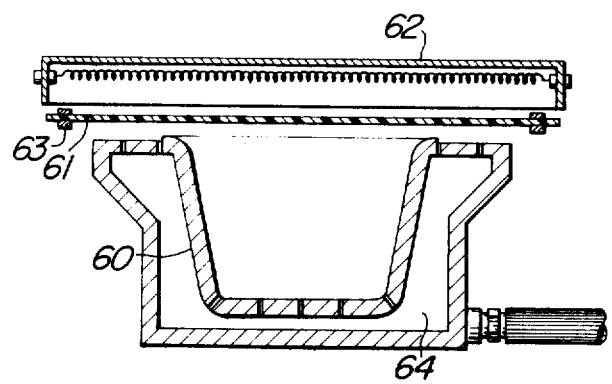
Figure 14:
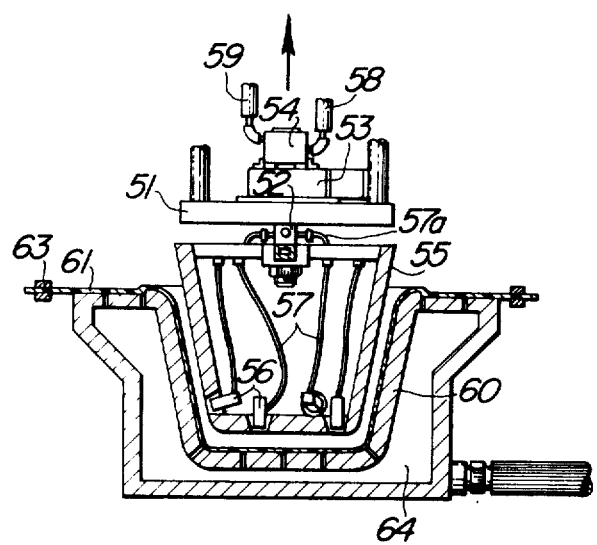

Hereunder an explanation will be made on the film forming operation using the convex type auxiliary device shown in FIG. 11. First, a thermoplastic synthetic resin film 61 is supported by supports 63 and placed horizontally above a pattern having a deep concave portion 60 as shown in FIG. 13. The film 61 is heated by a heating means 62 placed above the film 61 to a state in which the film 61 shows a good extensibility, followed by the removal of the heating means 62. Then, as shown in FIG. 14, the auxiliary device is operated, so that the fitting plate 51 is lowered, and the auxiliary convex member 55 is inserted into the pattern 60 from above the film 61 while stretching the film 61.

Subsequently, the supports 63 are lowered to cover the upper surface of the pattern 60 with the film 61, and a reduced pressure chamber 64 in the pattern 60 is brought into communication with a vacuum pump (not shown). As a result of this operation, the film 61 is further stretched with a sucking action being applied thereon and comes properly in tight contact with the surface of the pattern 60. Then, the supports 63 are removed from the film 61, and the fitting plate 51 is raised. During the upward movement of the fitting plate 51, the reduced speed motor 53 is energized and compressed air is supplied to the injection nozzle 56 through the supply pipe 59 and the hollow rotating shaft 52. At the same time, a coating material is supplied to the injection nozzles 56 through the supply pipe 58 and the hollow rotating shaft 52 so that the coating material is discharged from the injection nozzles 56. At this point, the auxiliary convex member 55 is moved upwardly while being rotated with the result that the whole surface of the film 61 is coated substantially uniformly by the coating material discharged from the injection nozzles 56. When the upwardly moving auxiliary member means 55 has reached a predetermined height, the reduced speed motor 53 is deenergized and the supply of compressed air and a coating material is terminated. The auxiliary member means 55 continues to move upwardly until it arrives at the original position thereof.

Figure 15:
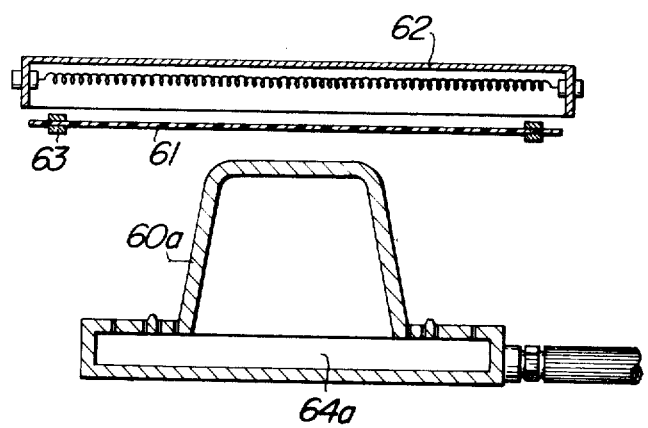
Figure 16:
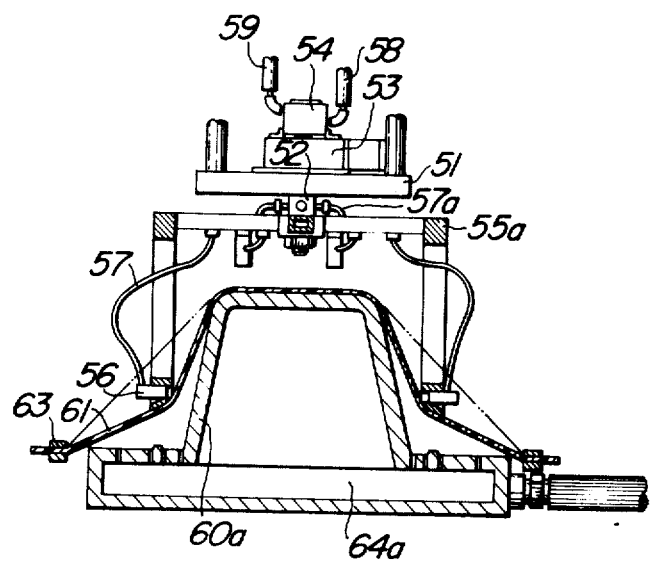

An explanation will be given hereunder on the film forming operation using the concave type auxiliary device shown in FIG. 12. A film 61 stretched above a pattern having a high convex portion 60a is heated by a heating means 62 to a state in which the film 61 shows a good extensibility as shown in FIG. 15, followed by the removal of the heating means 62. Then, supports 63 are lowered to a plane including the base of the pattern 60a. With this operation, the central part of the film 61 comes in contact with the top of the pattern 60a and is stretched. Subsequently, as shown in FIG. 16, the auxiliary device is operated so that a fitting plate 51 is lowered. The lower end of an auxiliary concave member 55a moves downwardly to reach the base of the pattern 60a, with the film 61 being pressed by said lower end of the auxiliary concave member 55a onto the upper peripheral edge of the pattern 60a. At this point, the film 61, which has been stretched between the top of the pattern 60a and the support 63 as indicated by the imaginary line in the figure, is further stretched to substantially conform with the shape of the pattern 60a. Then, a reduced pressure chamber 64a in the pattern 60a is brought into communication with a vacuum pump (not shown), so that the film 61 comes in tight contact with the pattern 60a in the same manner as described previously. Subsequently, the supports 63 are removed from the film 61, and the fitting plate 51 is raised. During the upward movement of the fitting plate 51, a reduced speed motor 53 is energized, and compressed air is supplied to injection nozzles 56 through a supply pipe 59 so that the injection nozzles 56 operate. Thus, the whole surface of the film 61 is coated substantially uniformly in the same manner as described previously.

Although in this embodiment the auxiliary devices are constructed to be movable vertically, alternatively the patterns 60 and 60a may be constructed to be movable vertically. In such a case, the supports shown in FIG. 13 must move vertically synchronizing with the movement of the pattern 60 when forming the film.

As is clear from the foregoing, in accordance with the present invention it is possible to apply a film surely on a pattern attaining a proper forming of the film without any possibility that wrinkles are produced on the surface of the film applied on an external pattern or an internal pattern, and with the changes in the thickness of film due to the stretching of film being limited to a minimum. Thus, the present invention can accomplish a mold having a deep concave portion or a high convex portion by the use of a vacuum sealed molding process which heretofore has been considered to be very difficult, and enjoys an outstanding advantage that the whole surface of a film can be coated substantially uniformly at the same time that the film is applied properly on a pattern and formed to a desired shape.

We claim:

1. A process of making a mold composed of an internal and external complimentary mold halves respectively having a high convex portion and a deep concave portion comprising:

a. making the internal mold having a deep concave portion of an external pattern, the shape of the surface of said external pattern being complimentary to that of the high convex portion of the internal mold comprising providing a synthetic resin film; softening said film by heating; positioning said film between said external pattern and an auxiliary convex member which has a convex surface facing the film generally complimentary to that of the concave portion of the external pattern; moving said auxiliary convex member toward the bottom of the external pattern with the peripheral portion of the film contacting the edge portion of the concave portion of the external pattern such that the film is deformed around said auxiliary convex member in a shape similar to the shape of the concave surface of the external pattern; applying a negative pressure to the outer surface of the film through the wall of the external pattern to bring the film into tight contact with the concave surface of the external pattern; removing the auxiliary convex member from within the external pattern; assembling the external pattern with the film thereon and a molding flask; positioning a cup shaped frame with an opening formed in the bottom thereof in the molding flask; placing a heat resistant particulate material in the space between the bottom portion of the cup shaped frame and the bottom portion of the external pattern through the opening; covering the opening with a film; releasing the negative pressure on the outer surface of the film; applying a negative pressure to the inner surface of the film through the particulate material to bring the film in tight contact with the particulate material; and removing the external pattern from the molding flask, thereby forming the internal mold;

b. making the external mold having a high convex portion of an internal pattern, the shape of the surface thereof being complimentary to that of the deep concave portion of the external mold comprising providing a synthetic resin film; softening said film by heating; positioning said film between said internal pattern and an auxiliary external hollow frame member, the bottom inner edge portion of said frame being kept parallel to the film and the inner space of said frame being large enough to cover a substantial portion of the convex portion of the internal pattern; pushing said film with said frame toward the convex portion of said internal pattern until the film is deformed similar to the shape of the convex surface of the internal pattern; applying a negative pressure to the inside surface of the film through the wall of the internal pattern to bring the film into tight contact with the convex portion; removing the auxiliary external frame member from the internal pattern; assembling the internal pattern with the film thereon and a molding flask; placing a heat resisting particulate material onto the film; releasing the negative pressure on the inner surface of the film; applying a negative pressure to the outer surface of the film through the particulate material to bring the film into tight contact with the particulate material; and removing the internal pattern from the molding flask, thereby forming the external mold; and c. assembling the internal and external molds.

* * * * *